(12) United States Patent
Iwao et al.

(10) Patent No.: US 6,227,998 B1
(45) Date of Patent: May 8, 2001

(54) POWER TRANSMISSION ARRANGEMENT FOR VEHICLE

(75) Inventors: Nobuyuki Iwao; Yasushi Yamamoto, both of Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 09/325,264

(22) Filed: Jun. 3, 1999

(30) Foreign Application Priority Data

Jun. 8, 1998 (JP) .................................................. 10-159234

(51) Int. Cl.⁷ ............................ B60K 41/22; F16H 61/14
(52) U.S. Cl. ................................ 477/79; 477/86; 477/174
(58) Field of Search ..................................... 477/166, 168, 477/174, 175, 180, 79, 80, 86; 192/3.3

(56) References Cited

U.S. PATENT DOCUMENTS

| | | | |
|---|---|---|---|
| 4,295,551 | * 10/1981 | Zimmerman et al. | 477/174 X |
| 4,509,625 | * 4/1985 | Tellert | 477/86 |
| 4,971,183 | * 11/1990 | Tellert | 477/166 X |
| 5,020,646 | * 6/1991 | Koshimo | 192/3.33 X |
| 5,101,943 | * 4/1992 | Bulgrien | 192/3.63 |
| 5,630,773 | * 5/1997 | Slicker et al. | 477/176 |

FOREIGN PATENT DOCUMENTS 10-184726   7/1998   (JP) .................................. F16D/25/12

* cited by examiner

*Primary Examiner*—Sherry Estremsky
(74) *Attorney, Agent, or Firm*—McCormick, Paulding & Huber LLP (57) ABSTRACT

A power transmission arrangement for a vehicle adapted to transmit a drive power from an engine to a transmission via a wet multi-plate clutch. An electronic controller automatically disengages and engages the clutch normally, but does not engage the clutch if a transmission gear position other than a predetermined one is selected for starting of a vehicle. This prevents clutch engagement with an excessively high gear position. Otherwise, the clutch would overslip and be deteriorated soon. A torque converter may further be provided in tandem to the clutch so that the engine power is transmitted to the transmission through the clutch and torque converter.

6 Claims, 6 Drawing Sheets

POWER TRANSMISSION ARRANGEMENT FOR VEHICLE

BACKGROUND OF THE INVENTION

1. Field of the Invention

The present invention relates to a power transmission arrangement for a vehicle.

2. Description of the Related Art

Figure 6:
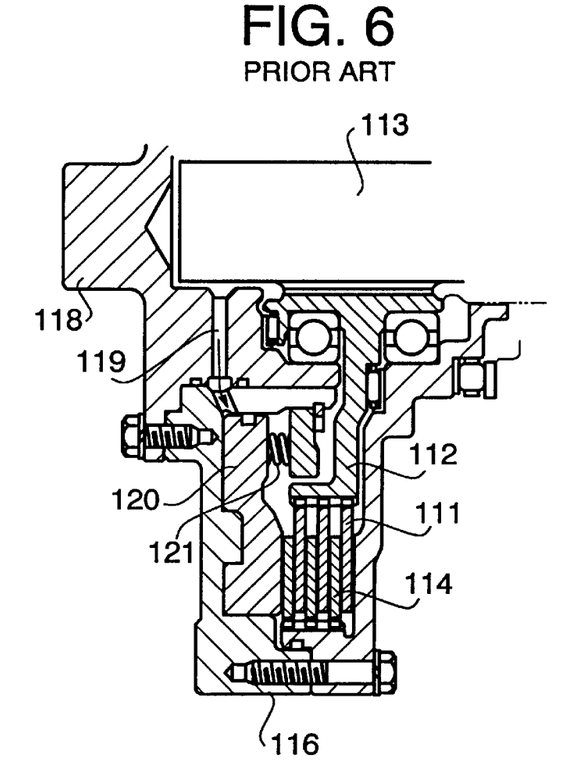
FIG. 6 is a cross sectional view of a wet multi-plate clutch.

An automatically and hydraulically controlled wet multiplate clutch is well known in the art for transmitting a drive force or power of an engine to a transmission. As illustrated in FIG. 6 of the accompanying drawings, this type of clutch generally includes a plurality of clutch plates (i.e., drive plates 114 and driven plates 111) housed in a clutch housing 116, and a clutch piston 120 for pushing the drive and driven plates against each other to engage the clutch. An oil pressure controlled to an appropriate value is fed to the clutch piston 120 through an oil passage 119 as indicated by the arrow. When the oil pressure is released, the clutch piston 120 is returned back by a return spring 121 such that the engaging force no longer acts on the clutch plates to disengage the clutch.

The clutch housing 116 is an input side of the clutch, and an input shaft 118 of the clutch is operatively connected to a crankshaft (not shown) of an engine to obtain a power from the engine. An output shaft 113 rotatably extends in the clutch housing 116. The output shaft 113 is an output side of the clutch and operatively coupled to an input shaft (not shown) of a transmission. The drive plates 114 are mounted on the clutch housing 116, and the driven plates 111 are attached to the output shaft 113 via a clutch holder 112. The clutch plates are mounted or attached to the associated parts by way of splines.

Figure 7:
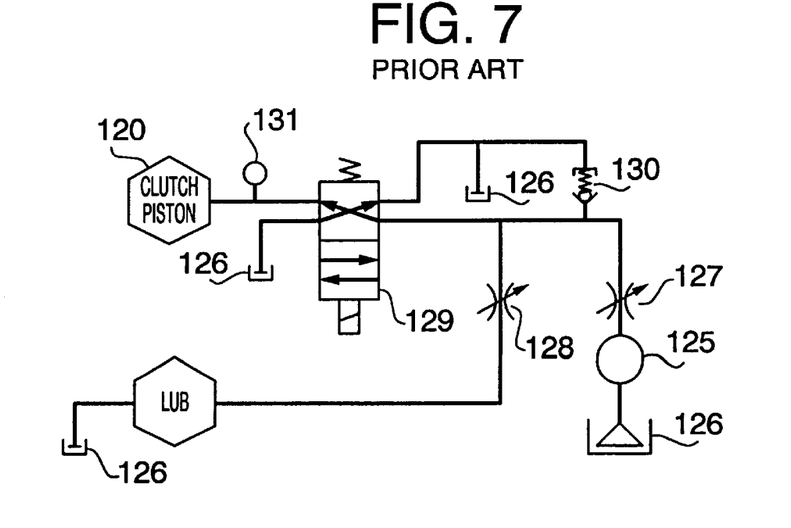
FIG. 7 illustrates a hydraulic circuit diagram for an oil feeding system.

Referring to FIG. 7 of the accompanying drawings, illustrated is an oil pressure feed system. An oil pump 125 is driven by the engine to draw an oil from an oil tank 126 and feed the oil toward the clutch piston 120 and other components to be lubricated. On its way, the oil is controlled in flow rate and pressure by adjustable (or variable) metering valves 127 and 128. Feeding and releasing of the oil to and from the clutch piston 120 are determined by an electromagnetic switching valve 129. A reference numeral 130 designates a relief valve.

In the wet multi-plate clutch, the clutch plates are included in the above-mentioned "other components to be lubricated", so that the lubrication oil is fed to the clutch plates. This lubrication oil feeding is necessary to allow friction heat generated upon clutch engagement to escape via the oil. In this manner, the clutch plates are oil cooled. Therefore, it is possible for the clutch to slip in a longer period in the wet multi-plate clutch than a dry friction clutch.

If the wet multi-plate clutch is employed and an automatic clutch system for automatic clutch engaging and disengaging is incorporated in a vehicle, it is possible to cause the clutch to slip for a relatively long period during vehicle starting so that it is in turn possible to select a relatively high gear position from the beginning.

However, if the gear position is too high at the starting or the starting with a high gear position is repeatedly experienced, the clutch will soon be deteriorated.

The present assignee proposed an arrangement which combines a torque converter with a wet multi-plate clutch (Japanese Patent Application, Laid-Open Publication No. 10-184726). A shock generated upon automatic clutch engagement is absorbed in this arrangement, so that complicated clutch engagement control is not needed during the starting (particularly sudden starting or rapid acceleration). However, even if this arrangement is employed, an excessively large load acts on the torque converter if the starting with a high gear position is repeated. As a result, the torque converter oil and/or torque converter itself will be damaged in a reduced period. In addition, if the same oil is commonly used as the clutch lubrication oil and the torque converter oil, deterioration of the torque converter oil promotes deterioration of the clutch.

SUMMARY OF THE INVENTION

An object of the present invention is to prevent the starting of a vehicle with an excessively high gear position.

Another object of the present invention is to prevent repetition of the starting with a relatively high gear position.

Still another object of the present invention is to prevent deterioration of a clutch and protect the clutch.

Yet another object of the present invention is to reduce a torque converter load when a torque converter is combined with a wet multi-plate clutch.

Another object of the present invention is to prevent degradation of a torque converter oil and torque converter itself.

Another object of the present invention is to prohibit deterioration of a clutch caused by deterioration of a torque converter oil.

Another object of the present invention is to prevent the controlling from being affected by oil deterioration.

Still another object of the present invention is to prevent a vehicle from moving backward on an upward slope when the above described controlling for clutch protection is performed.

According to one aspect of the present invention, there is provided a power transmission arrangement for a vehicle including a wet multi-plate clutch adapted to transmit a drive force or power of an engine to a transmission, and a control unit for automatically disengaging and engaging the clutch and for interrupting (or not carrying out) clutch engagement if a transmission gear position other than a predetermined one is selected for the starting of the vehicle when a vehicle is stopped.

Preferably, a torque converter is coupled with the clutch in series. The clutch may be hydraulically controlled. A single oil may preferably be used as a clutch lubrication oil, an oil used for controlling and a torque converter oil. The control unit may be an electronic controller.

According to a second aspect of the present invention, there is provided a power transmission arrangement for a vehicle including a wet multi-plate clutch adapted to transmit a power of an engine to a transmission, and a control unit for automatically disengaging and engaging the clutch normally but not for engaging the clutch if a transmission gear position other than a predetermined one is selected for the starting and a brake is operating when a vehicle is stopped.

Preferably, the brake may be a hand brake or a braking force holding device (hereinafter referred to as "hill start aid" or HSA device) used to stop and restart a vehicle on an upward slope.

According to a third aspect of the present invention, there is provided a vehicle power transmission arrangement including a wet multi-plate clutch and torque converter adapted in combination to transmit a power of an engine to a transmission, the torque converter provided in series with the clutch, and a control unit for automatically engaging and disengaging the clutch and for controlling the engine according to stamping of an accelerator pedal. The control unit starts clutch engagement when an engine revolution speed reaches a prescribed value as a result of stamping of the accelerator pedal from a vehicle stopped condition. The control unit, however, interrupts or does not carry out the clutch engagement if a transmission gear position other than a predetermined one is selected for the vehicle starting and a brake is operating when the vehicle is stopped. If the brake is not being applied, the control unit allows the clutch engagement, and causes the engine to rotate at a low revolution speed below the prescribed revolution value regardless of stamping of the accelerator pedal.

An accelerator sensor may be provided for outputting an accelerator signal in response to stamping of the accelerator pedal (or according to a stamping stroke). The control unit may control the engine based on the accelerator signal. The control unit may also maintain the engine revolution speed at a low speed below the prescribed value by disregarding the accelerator signal. The brake may be a hand brake or an auxiliary device used for restarting on a slope such as HSA.

According to a fourth aspect of the present invention, there is provided a power transmission arrangement including a wet multi-plate clutch adapted to transmit a power from an engine to a transmission, and a control unit for automatically engaging and disengaging the clutch and for controlling the engine according to stamping of an accelerator pedal. The control unit starts clutch engagement when an engine revolution speed reaches a prescribed value as a result of stamping of the accelerator pedal from a vehicle stopped condition. The control unit maintains the engine revolution speed at a low value below the prescribed value regardless of the accelerator pedal stamping if a transmission gear position other than a predetermined one is selected for the vehicle starting.

An accelerator sensor may be provided for outputting an accelerator signal in response to stamping of the accelerator pedal. The control unit may control the engine according to the accelerator signal. The control unit may also maintain the engine revolution speed at a low speed below the prescribed value by disregarding the accelerator signal. A torque converter may be coupled with the clutch in series. The clutch may be hydraulically controlled, and a single oil may commonly be used as a clutch lubrication oil, an oil for the controlling, and a torque converter oil. The control unit may be an electronic controller.

According to a fifth aspect of the present invention, there is provided a power transmission arrangement including a wet multi-plate clutch and torque converter adapted in combination to transmit a power of an engine to a transmission, the torque converter being located in series with the clutch, and a control unit for automatically engaging and disengaging the clutch and for controlling the engine according to stamping of an accelerator pedal. The control unit starts clutch engagement when an engine revolution speed is raised to a prescribed value as a result of stamping of the accelerator pedal from a vehicle stopped condition. The control unit engages the clutch if a transmission gear other than a predetermined one is selected for the starting when the vehicle is stopped. In this case, the control unit maintains the engine revolution speed at a low value below the prescribed value regardless of the accelerator pedal stamping.

According to a sixth aspect of the present invention, there is provided a power transmission arrangement including a wet multi-plate clutch, a torque converter provided in series with the multi-plate clutch and adapted in combination with the multi-plate clutch to transmit a power of an engine to a transmission, a lock-up clutch provided in parallel to the torque converter, and a control unit for automatically engaging and disengaging the multi-plate clutch as well as the lock-up clutch. The control unit engages the lock-up clutch if a transmission gear other than a predetermined one is selected for the starting when the vehicle is stopped.

According to a seventh aspect of the present invention, there is provided a power transmission arrangement including a wet multi-plate clutch, a torque converter provided in series with the multi-plate clutch and adapted in combination with the multi-plate clutch to transmit a power of an engine to a transmission, a lock-up clutch provided on the torque converter, and a control unit for automatically engaging and disengaging the multi-plate clutch as well as the lock-up clutch. The control unit starts multi-plate clutch engagement when an engine revolution speed is raised to a prescribed value upon accelerator pedal stamping from a vehicle stopped condition. The control unit also engages the lock-up clutch when a transmission gear position other than a predetermined one is selected for the starting and the engine revolution speed is raised to the prescribed value.

According to an eighth aspect of the present invention, there is provided a power transmission arrangement for a vehicle adapted to transmit a drive power from an engine to a transmission, including a clutch, a hydraulic transmitting device coupled with the clutch in series, and a controller for disengaging and engaging the clutch normally, but not for engaging the clutch if a transmission gear position other than a predetermined one is selected for starting of a vehicle when the vehicle is stopped. The clutch may be a single plate type. The hydraulic transmission device may be a torque converter or a fluid coupling.

DETAILED DESCRIPTION OF THE INVENTION

Now, embodiments of the present invention will be described with reference to the attached drawings.

Figure 1:
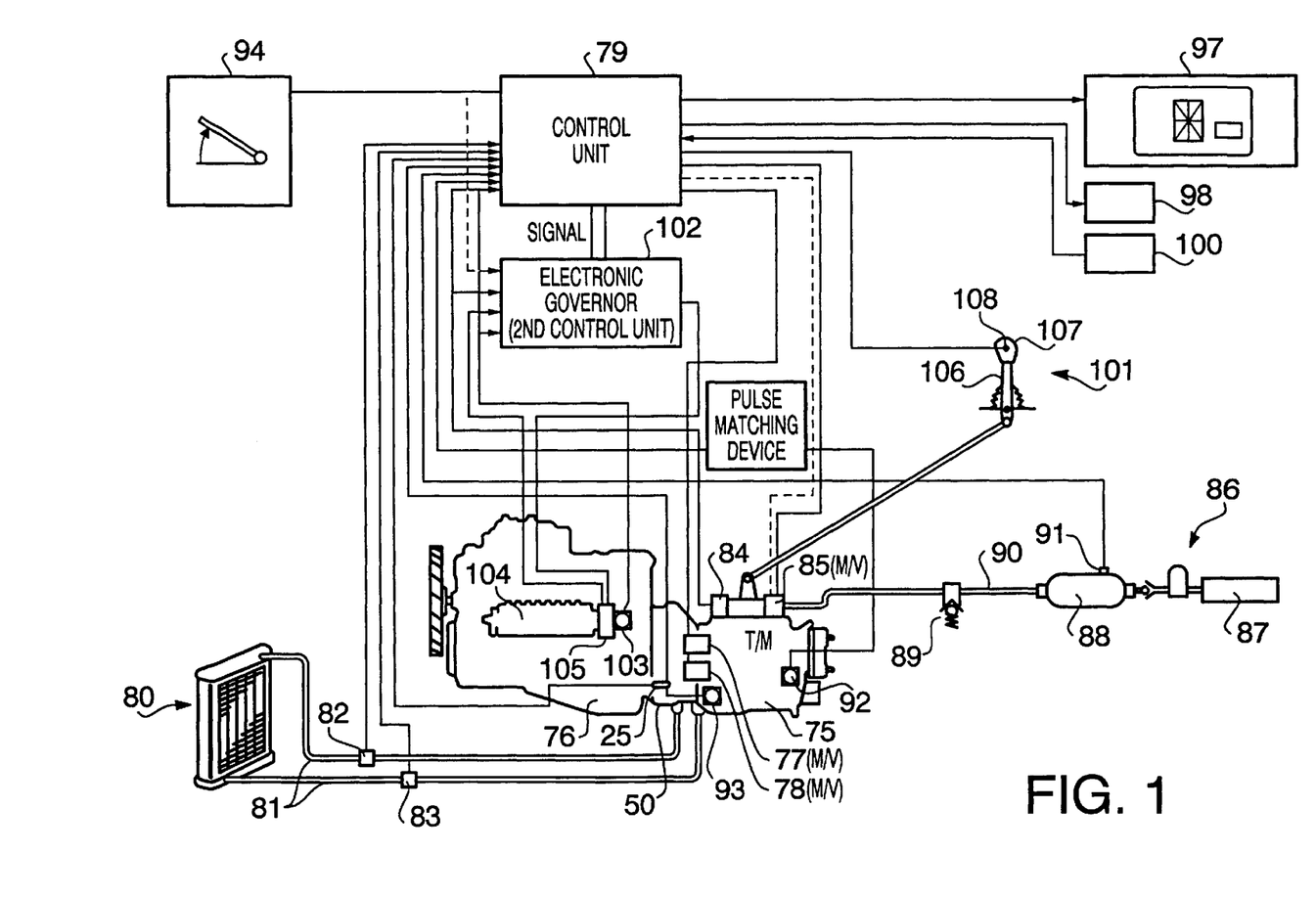
FIG. 1 schematically illustrates a power transmission arrangement according to the present invention.

Referring to FIG. 1, illustrated is a power transmission arrangement according to the present invention which includes a clutch-torque converter unit 50 between an engine 76 and a transmission 75. The clutch-torque converter unit 50 is inseries (or tandem) combination of a hydraulically controlled wet multi-plate clutch and a torque converter housed in a single housing (will be described later). The engine 76 is a diesel engine in this embodiment.

The transmission 75 is a manual transmission which is mechanically operated with a shift lever device 101. A driver of a vehicle manually changes a gear position (shift position) of the transmission 75 with the shift lever. This transmission 75 is equipped with a shift interlock mechanism. Specifically, an air pressure is selectively applied to an operation part of the transmission 75 from an air pressure application means 86 upon switching of an electromagnetic valve 85 caused by a control unit (electronic controller) 79. The air pressure fixes the operation part of the transmission 75 so that shift position change (or gear position change) of the transmission 75 and in turn movement (or operation) of the shift lever unit 101 are prohibited.

The air pressure application means 86 includes an air tank 88 connected to an engine compressor 87 and an air pipe 90 having a relief valve 89. The electromagnetic valve 85 is provided at an end of the air pipe 90. A pressure switch 91 electrically connected to the control unit 79 is physically attached to the air tank 88.

The shift lever unit 101 includes a shift lever 106 and a knob 107. When the driver operates the shift lever unit 101, the knob 107 slightly moves (shakes) before the shift lever 106 moves, so that a knob switch inside the shift knob 107 is turned on. The knob switch 108 is turned on when the shift knob 107 moves forward or backward in shifting directions, and turned off when the knob 107 is released from a driver's shifting force. The on/off signal is sent to the control unit 79 from the knob switch 108 so that the control unit 79 can know driver's intention of shift position change.

The transmission 75 is equipped with a vehicle speed sensor 92, an input shaft rotation sensor 93 and a gear position sensor 84. All of these components are connected to the control unit 79.

An accelerator sensor 94 and a hand brake switch 100 are also connected to an input of the control unit 79, and a gear position indicator lamp 97 and an alarm 98 are connected to an output of the controller 79. The accelerator sensor 94 generates an electric signal (accelerator signal) in accordance with stamping of an accelerator pedal. The hand brake switch 100 is turned on when it is operated and turned off when it is in a non-actuated position. The gear position lamp 97 and alarm 98 are provided in a vehicle compartment. The gear position lamp 97 indicates a current gear position, and the alarm 98 generates a buzzer sound or lights a lamp when turned on by the control unit 79.

The engine 76 is electronically controlled in the following manner in this embodiment. Specifically, the control unit 79 determines an engine load based on an output from the accelerator sensor 94 (accelerator signal) and an engine revolution speed based on an output from an engine rotation sensor 103. The control unit 79 then determines a target amount of fuel injection from these values primarily. An electric power according to the target fuel injection quantity is output from a second control unit 102 to control an electronic governor 105 for controlling of fuel injection.

Figure 2:
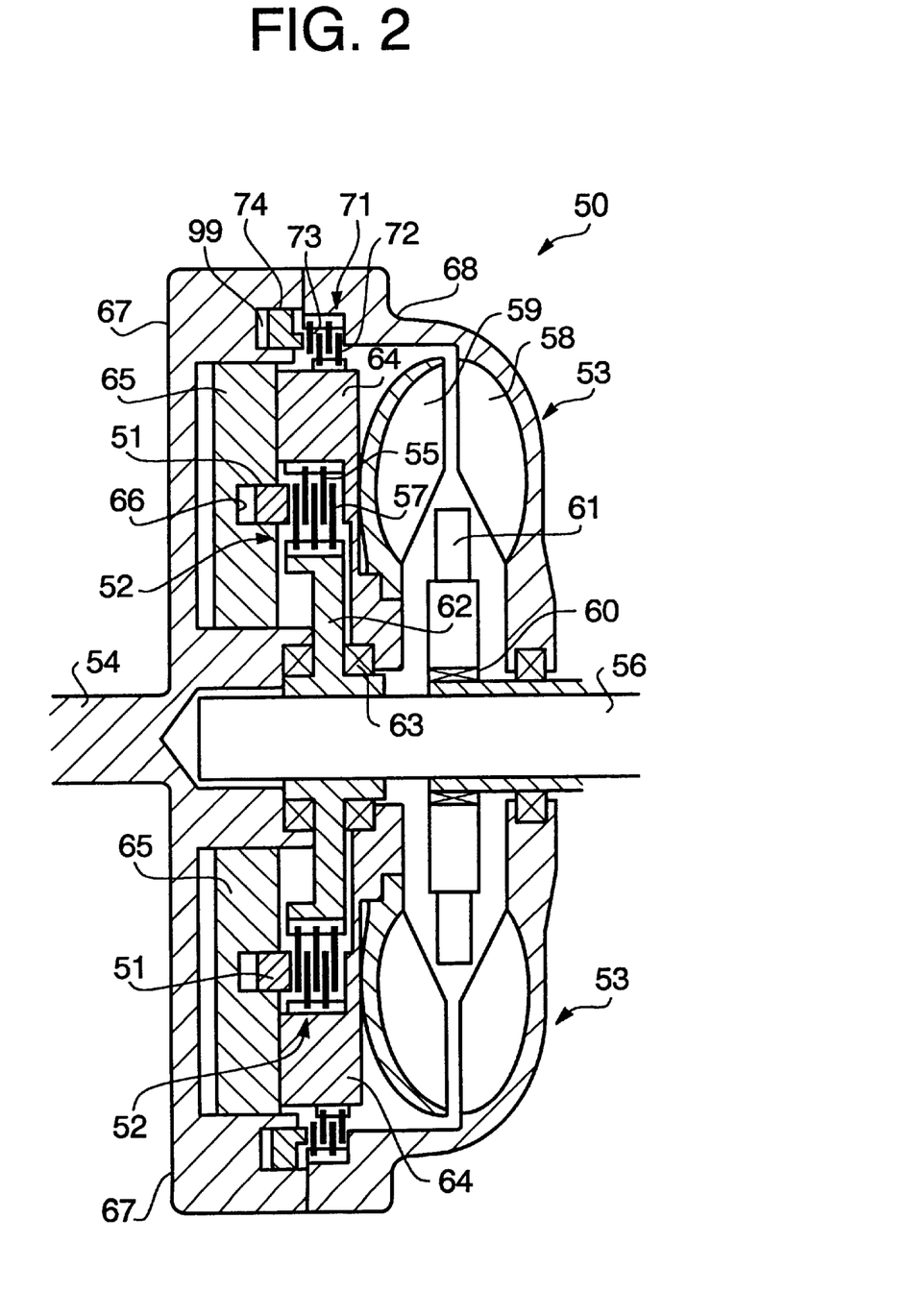
FIG. 2 is a cross sectional view of a clutch-torque converter unit.

Referring to FIG. 2 which illustrates the detail of the clutch-torque converter unit 50, this unit includes a main clutch 52 and a torque converter 53. The main clutch 52 is a hydraulically controlled wet multi-plate clutch in this embodiment. A lock-up clutch 71 is provided for locking the torque converter 53. This lock-up clutch 71 is also a hydraulically controlled wet multi-plate clutch. The torque converter 53 and the main clutch 52 are located in series from the engine side, and the torque converter 53 and the lock-up clutch 71 are in parallel to each other (will be described in detail).

An engine power is input to an input shaft 54. The left end of the input shaft 54 (not shown) is operatively connected to a crankshaft of the engine 76. A front cover 67 and a torque converter housing 68 are fixedly mounted on the input shaft 54. The torque converter 53 has a three-part impeller structure and includes a pump part 58 rotating with the torque converter housing 68, a turbine part 59 opposed to the pump part 58, and a stator part 61 mounted on a stationary portion via a one way clutch 60. In the illustrated torque converter 53, the pump part 58 rotates when the input shaft 54 rotates, so as to cause an oil (working fluid) to circulate around the input shaft 54. The circulating oil then causes the turbine part 59 to rotate. Accordingly, the turbine part 59 generates a torque. The oil lubricates not only the input shaft 54 but also the pump part 58, turbine part 59 and stator part 61 in turn. In other words, the oil flows in right and left directions as well as up and down directions in the illustration. The torque converter 53 is closer to the transmission 75 than the main clutch 52.

In a space defined by the front cover 67 and torque converter housing 68, provided are a main clutch holder 64 and a main clutch piston outer holder 65. These holders are coupled with each other and supported on an output shaft 56 via a bearing 63 and a clutch holder 62 such that they are rotatable about the output shaft 56. The output shaft 56 is coaxial to the input shaft 54 and its right end (not shown) is operatively connected to an input shaft of the transmission 75. The clutch holder 62 is provided on the output shaft 56 by way of spline (not shown) so that it is not rotatable relative to the output shaft 56. The main clutch piston outer holder 65 is rotatable in an inner recess of the front cover 67 but is not movable in an axial direction of the output shaft 56. The turbine part 59 of the torque converter 53 is securely coupled to the main clutch holder 64 so that the turbine part 59 is rotatable about the output shaft 56.

It is the main clutch 52 that connects and disconnects the turbine part 59 (i.e., the output of the torque converter 53) to and from the output shaft 56. The main clutch 52 includes a plurality of drive plates 55 supported by the main clutch holder 64 by means of spline and movable in the axial direction of the output shaft 56, and a plurality of driven plates 57 supported by the clutch holder 62 by means of spline and movable in the output shaft axial direction. The drive and driven plates 55 and 57 are alternately arranged in the axial direction of the output shaft 56. The main clutch piston outer holder 65 has a cylinder chamber 66 in which a main clutch piston 51 is received for movement in the axial direction of the output shaft 56. By feeding the oil into the cylinder chamber 66 to cause the main clutch piston 51 to move toward the plates 55 and 57, the plates 55 and 57 are pushed against each other to establish friction contact therebetween. This results in engagement of the main clutch 52. Consequently, the output of the torque converter 53 and the output shaft 56 are coupled to each other.

On the outer periphery of the main clutch 52, provided is the lock-up clutch 71 having a similar structure. The lock-up clutch 71 directly connects the pump part 58 of the torque converter 53 with the turbine part 59. The lock-up clutch 71 includes a plurality of drive plates 73 provided on the torque converter housing 68 by way of spline and movable in the axial direction of the output shaft 56, and a plurality of driven plates 72 provided on the main clutch holder 64 by way of spline and movable in the output shaft axial direction. A cylinder chamber 99 formed in the front cover 67 receives a lock-up clutch piston 74 which is movable in the axial direction of the output shaft 56. When an oil pressure is applied to the piston 74, the plates 73 and 72 are forced into friction contact to establish engagement of the lock-up clutch 71. This locks the torque converter 53.

On the transmission side of the torque converter 53, provided is an oil pump (not shown) operatively associated with the torque converter housing 68. The oil pressure generated by this oil pump is controlled to a suitable value by a known oil pressure application device such as the one shown in FIG. 7 and then fed to the cylinder chambers 66 and 99 to apply a desired clutch engaging force respectively. It should be noted that reference numerals 77 and 78 in FIG. 1 designate electromagnetic switching valves used to switch between feeding and releasing of the oil pressure to and from the cylinder chambers 66 and 99 respectively.

The main clutch 52, lock-up clutch 71 and torque converter 53 share the same oil as their working oil. This common oil fills the space defined by the front cover 67 and torque converter housing 68. The oil is fed to the cylinder chambers 66 and 99 through separate conduits, and used for the controlling.

In FIG. 1, reference numeral 80 designates an oil cooler for cooling the heated oil. The oil cooler 80 is connected to the clutch-torque converter unit 50 via pipes 81. A temperature sensor 82 and a pressure sensor 83 are provided on the pipes 81, and the oil temperature and oil pressure are administered by the control unit 79.

Now, an operation of the power transmission arrangement during normal condition will be described. When the vehicle is stopped and idling, the turbine part 59 is caused to rotate by the pump part 58 (it generally trails the pump part 58) in the torque converter 53 so that the main clutch 52 and lock-up clutch 71 are in the disengaged conditions respectively. Thus, the turbine part 59 and associated components idle. Next, it should be assumed that a driver intends to start the vehicle and applies a force to the knob 107 of the shift lever device 101. Then, the knob switch 108 is turned on. This causes the control unit 79 to switch the electromagnetic valve 85 so as to unlock the shift interlock. As a result, it is possible for the driver to move the shift lever into a desired gear position (shift position) of the transmission 75 for the starting. It should be then assumed that the driver stamps the accelerator pedal. This causes the control unit 79 to raise the engine revolution speed as described earlier. If it is determined from the output of the engine revolution speed sensor 103 that the engine revolution speed reaches a predetermined value, the control unit 79 switches the electromagnetic valve 77 to start engagement of the main clutch 52. The vehicle starts as the main clutch 52 is engaged. After that, the electromagnetic valve 85 is switched to establish the shift interlocking again.

During cruising, if the driver wants to change the transmission gear position and touches the knob 107 with a certain force, the knob switch 108 is turned on. This causes the control unit 79 to unlock the shift interlocking and disengage the main clutch 52. Subsequently, the driver moves the shift lever 106. When the control unit 79 knows which gear position of the transmission 75 is selected and learns a fact that a force is no longer applied to the knob 107 by the driver's hand, the control unit 79 causes the main clutch 52 to engage. Completion of change (or shifting) of the transmission gear position is determined from the output of the gear position sensor 84. That no force acts on the knob 107 is determined from a fact that the knob switch 108 is turned off. When the main clutch 52 is successfully engaged, a series of transmission gear shifting operations is complete, and the shift interlocking is again established.

If the control unit 79 determines from the outputs of the gear position sensor 84 and vehicle speed sensor 92 that the vehicle is cruising, then it switches the electromagnetic valve 78 to engage the lock-up clutch 71. This establishes locking of the torque converter 53.

The power transmission arrangement has the following advantages: (1) Since the clutch is an automatic clutch, driver's fatigue is lessened. It should be noted that if an actuator is further combined to the transmission, a full automatic transmission will be constructed. (2) Since the torque converter 53 can be utilized for the starting, complicated control associated with partial engagement of the main clutch 52 is not needed. (3) The torque converter 53 can absorb a shock generated upon transmission gear position change. (4) Since the manual transmission 75 is employed, a gear ratio can be selected in a wider range as compared with a torque converter automatic transmission (shift position change) system which uses a planetary gear mechanism. (5) The life of the clutch is extended. (6) Since the torque converter 53 is located at the connection to the engine 76, noise and vibration of components associated with power transmission are reduced.

If an excessively high gear position is selected at the starting and/or the starting with a high gear position is repeated, the main clutch 52 is deteriorated quickly. In order to avoid reducing the life of the main clutch, the torque converter 53 is combined with the main clutch (wet multi-plate clutch) 52 in the present invention. Specifically, even if a high gear position is selected, the torque converter 53 slips so that the vehicle can start smoothly. In this case, however, a larger load acts on the torque converter 53 and accordingly the torque converter itself and/or torque converter oil is deteriorated quickly. Further, since the torque converter oil is also used for both clutch lubrication and clutch control, deterioration of the torque converter oil may result in deterioration or malfunctioning of the main clutch 52.

In the present invention, therefore, the following control is performed at the starting of the vehicle to prevent the degradation of the clutch and other components. It should be assumed here that the vehicle is started from a condition that the accelerator pedal is released, the transmission is in a neutral position and the vehicle is idling. The main clutch 52 and the lock-up clutch 71 are both disengaged, and the torque converter 53 is idling in an engaged condition.

Figure 3:
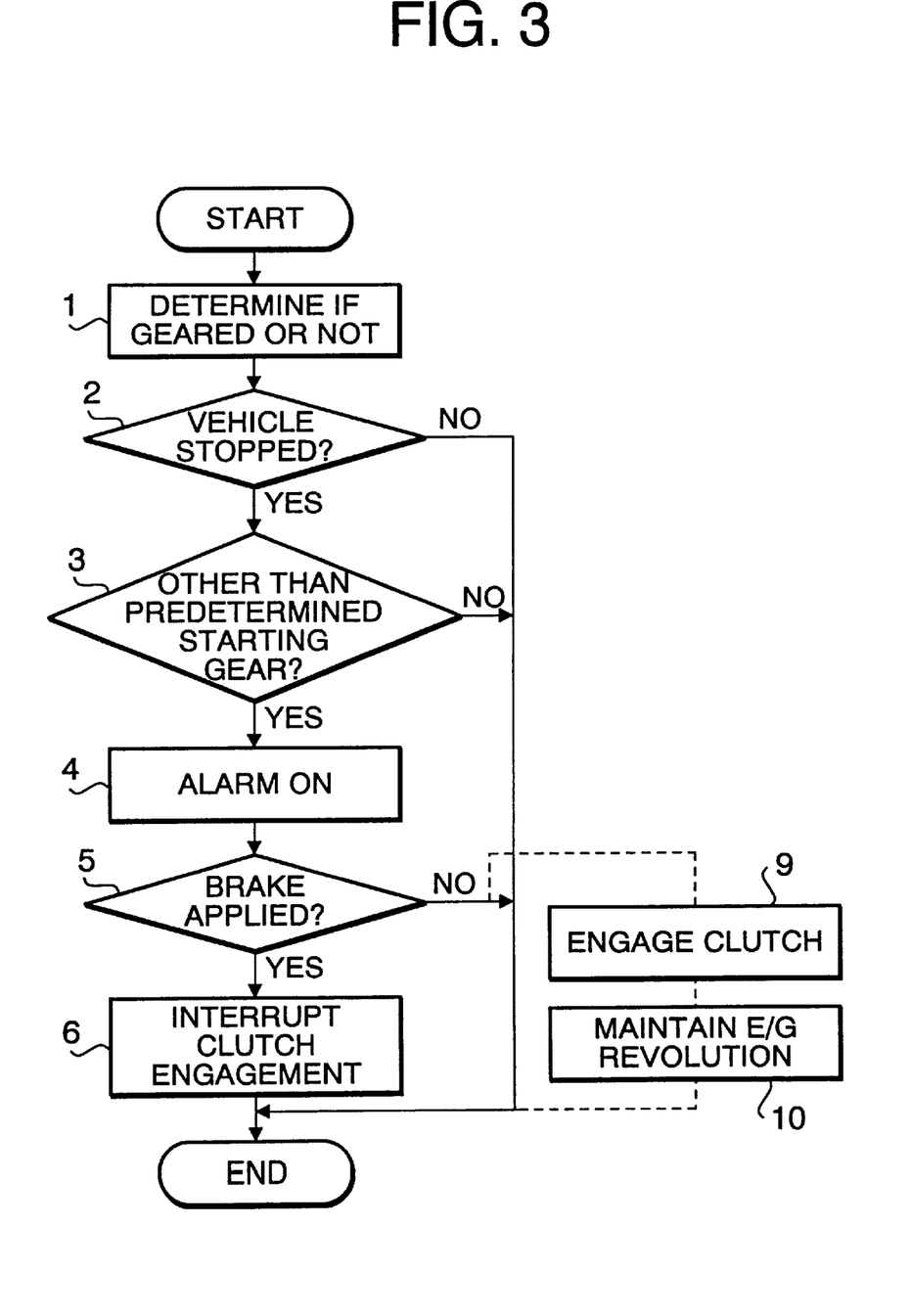
FIG. 3 illustrates a flowchart for a first exemplary way of control.

First Way of Control:

Referring to FIG. 3, it should be first assumed that a driver operates the shift lever into a particular transmission gear position. Then, the control unit 79 determines from the outputs from the gear position sensor 84 and knob switch 108 at Step 1 whether a gearing operation is complete. At Step 2, the control unit 79 determines from the output of the vehicle speed sensor 92 whether the vehicle is stopped or not. Here, the vehicle is assumed to be in a stopped condition. Thus, the program proceeds to Step 3 to determine whether the selected gear position is not a predetermined gear position suitable for starting.

If the predetermined gear position is not selected, i.e., if an excessively high gear position is selected, the program advances to Step 4 to turn on the alarm 98 thereby informing the driver of such a fact. This demands the driver to select another gear position. Next, at Step 5, the control unit 79 determines from the output of the hand brake switch 100 whether the hand brake is applied. If YES, the program proceeds to Step 6 to interrupt engagement of the main clutch 52. Consequently, the main clutch 52 is not engaged and the vehicle does not start even if the driver stamps the accelerator pedal and the engine revolution speed is raised. In this manner, the main clutch 52 is prohibited from being engaged when an excessively high gear position is chosen. Therefore, the deterioration of the main clutch 52 and other components is prevented.

If the vehicle is not stopped at Step 2 or if the suitable starting gear position is chosen at Step 3 or if the hand brake is not actuated at Step 5, the above described controlling is not executed but a normal operation is carried out to admit engagement of the main clutch 52.

The hand brake application is confirmed before interruption of the clutch engagement because otherwise the vehicle might start in an unexpected manner on a slope or the like. For example, it should be assumed that the vehicle is stopped on an upward slope using a foot brake (the driver's foot is on a foot brake pedal). When the driver wants to start the vehicle, he releases the foot brake pedal and stamps the accelerator pedal. If the main clutch 52 is not engaged, the vehicle may move backward (downward on the slope). In the present invention, therefore, the clutch engagement is prohibited only when the brake is applying. A normal starting is admitted when the brake is not applying. Accordingly, unintentional starting is prevented.

Figure 4:
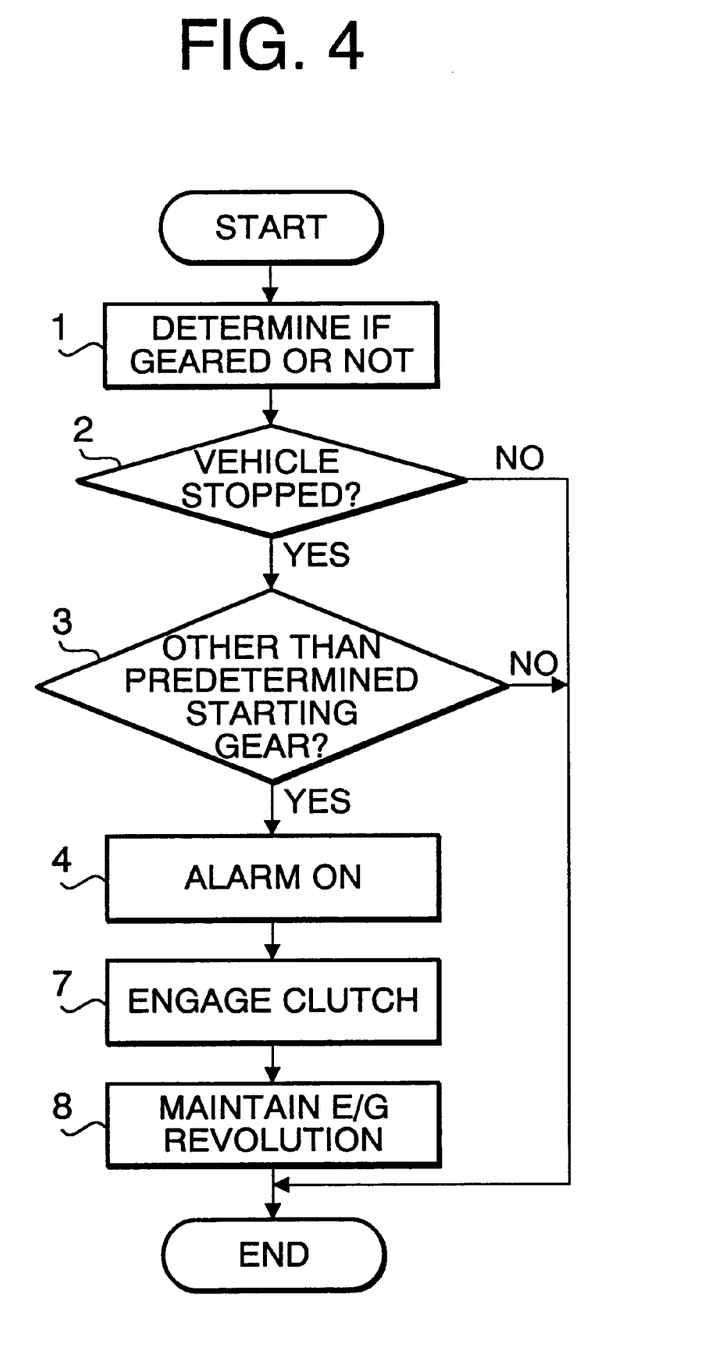
FIG. 4 illustrates a flowchart for a second exemplary way of control.

Second Way of Control:

Referring to FIG. 4, Steps 1 to 4 are the same as FIG. 3. In this example, Step 4 is followed by Step 7, at which the main clutch 52 is engaged. The program then proceeds to Step 8 to maintain the engine revolution speed at an idling value.

As a result, the engine is kept in the idling condition with the torque converter 53 generating a creeping force. Therefore, an excessive load is not applied to the torque converter due to engine over-revolution (overrunning) and backward movement of the vehicle on the upward slope is prevented.

At Step 8, the control unit 79 disregards the accelerator signal even if the output of the accelerator sensor 94 (accelerator signal) is sent to the control unit 79. Instead, the control unit 79 controls the engine revolution speed based on the engine idling condition. In general, the main clutch 52 is engaged only when the engine revolution speed reaches a predetermined value which is higher than the idling speed. Therefore, it should be noted that it is possible to prohibit clutch engagement by simply disregarding the accelerator signal (i.e., by omitting Step 7 and performing Step 8 only). In the present example of control, however, the clutch is positively engaged to generate the creeping force for prevention of unintentional backward movement of the vehicle on the upward slope.

It should be noted that in the first example of control, interrupting the engagement of the main clutch 52 (Step 6) is sufficient if protection to the main clutch 52 and the torque converter 53 are only concerned. In the second example of control, maintaining the engine revolution speed below the prescribed value is sufficient. Therefore, the engine revolution speed is not necessarily maintained at the idling condition. Further, another approach other than disregarding the accelerator signal may be employed in order to maintain the engine revolution speed below the predetermined value.

Moreover, it should be noted that the first and second ways of control may be combined. Specifically, Steps 9 and 10 of FIG. 3 may be added to the flowchart shown in FIG. 4 such that the main clutch 52 will be engaged when the hand brake is in the non-activated position, and the engine will be maintained at a low revolution speed.

Advantages of these ways of control will be compared with each other. In the first way of control, the engine control is not performed. Therefore, clutch protection is possible within the range of normal clutch control and the driver does not feel any uncomfortableness when operating the vehicle. If the engine control is executed, the engine does not overrun (over-revolution) in spite of stamping the accelerator pedal and therefore the drive feels uncomfortable or strange. In the first example, however, the drive does not experience such uncomfortableness. In the second way of control, it is unnecessary to confirm the operational condition of the brake. Consequently, the hand brake switch can be dispensed with. In the combination of first and second control, the engine control is carried out only when the brake is not operated. Therefore, the driver's uncomfortableness is reduced.

Instead of detecting the actuated or non-actuated condition of the hand brake, the operational condition of HSA may be used for the above described control. HSA is generally combined with the automatic clutch and controlled by the control unit. For example, when a vehicle is stopped by stamping a foot brake with a manual switch for HSA on, the foot brake is maintained locked even after a driver leaves his foot from the foot brake. In short, if the foot brake is stamped under a particular condition, it is locked. Then, when the clutch is engaged for the starting, the foot brake is released automatically. The relationship between the clutch engagement and the brake releasing is arbitrarily adjustable. Accordingly, it is possible to perform the above described control in response to turning on and off of HSA instead of actuation and non-actuation of the hand brake. HSA is a kind of automatic brake and is included in the "brake" of the invention.

Figure 5:
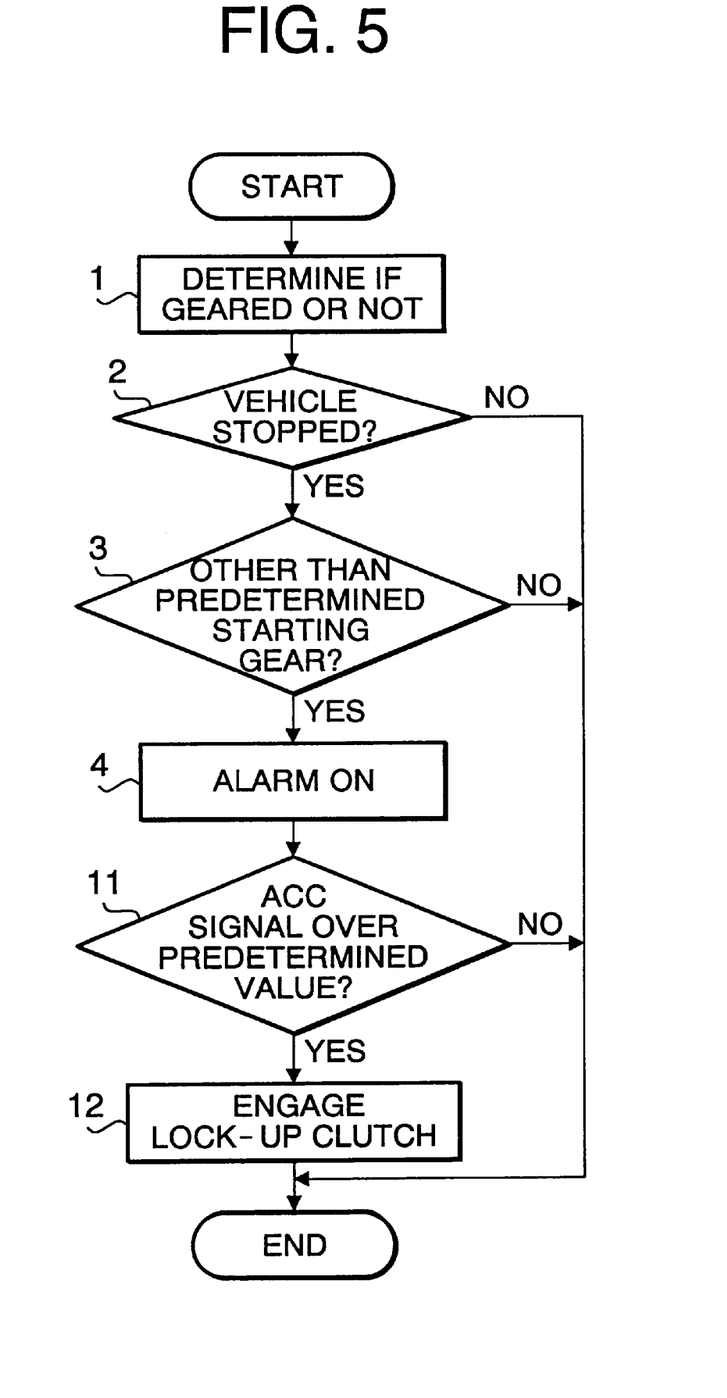
FIG. 5 illustrates a flowchart for a third exemplary way of control.

Third Way of Control:

Referring to FIG. 5, Steps 1 to 4 are the same as the previous examples. In this example, It is determined at Step 11 after Step 4 whether the accelerator signal is beyond a predetermined value, i.e., whether the accelerator pedal is stamped over a predetermined stroke. If the answer is YES, the program proceeds to Step 12 to engage the lock-up clutch 71.

The amount (or stroke) of accelerator pedal stamping is determined at Step 11 to know if a driver really wants to start the vehicle at a very high gear position. If such is the case, the lock-up clutch 71 is engaged to lock the torque converter 53 and cause only the main clutch 52 to slip. This informs the driver of abnormal high geared starting. If the torque converter 53 is not locked, then the torque converter 53 slips so that the starting engagement proceeds relatively smoothly and the driver does not feel uncomfortableness very much. In order to positively let the driver feel the uncomfortableness, the torque converter 53 is locked in the invention. The driver is then expected to select an appropriate gear. This control also protects the torque converter 53. It should be noted that another approach may be employed to determine the driver's intent, rather than detecting the accelerator signal.

As understood from the foregoing, the control unit 79 is the control means of the invention.

This application claims priority of Japanese Patent Application No. 10-159234 filed on Jun. 8, 1998 and the entire disclosure of the above-mentioned Japanese Patent Application is incorporated herein by reference.

What is claimed is:

1. A power transmission arrangement for a vehicle adapted to transmit a drive power from an engine to a transmission having a selectable number of gear positions and a selecting means for selecting one of said gear positions, comprising:

a wet multi-plate clutch; and a controller for disengaging and engaging the clutch and which controller acts to prevent engagement of the clutch when the vehicle is in a stopped condition if a transmission gear position other than a predetermined one suitable for starting movement of the vehicle is selected by the selecting means, and a brake is operated when the vehicle is stopped.

2. The power transmission arrangement of claim 1, wherein the brake is a hand brake or a braking force holding device.

3. The power transmission arrangement of claim 1, wherein the controller is adapted to control the engine according to stamping of an accelerator pedal, and starts clutch engagement when an engine revolution speed reaches a prescribed value as a result of stamping of the accelerator pedal from a vehicle stopped condition, but does not engage the clutch if a transmission gear position other than a predetermined one is selected for starting of the vehicle and a brake is operating when the vehicle is stopped, whereas the controller engages the clutch and causes the engine to rotate at a low revolution speed below the prescribed value regardless of stamping of the accelerator pedal if a transmission gear position other than the predetermined one is selected for the starting and the brake is not operating.

4. The power transmission arrangement of claim 3 further including an accelerator sensor for outputting an accelerator signal in response to stamping of the accelerator pedal, and wherein the controller controls the engine according to the accelerator signal normally but maintains the engine revolution speed below the prescribed value by disregarding the accelerator signal under a particular condition.

5. A power transmission arrangement for a vehicle comprising:

a wet multi-plate clutch;

a torque converter provided in series with the clutch and adapted in combination with the clutch to transmit a drive power of an engine to a transmission;

a lock-up clutch provided in parallel to the torque converter; and a controller for engaging and disengaging the clutch as well as the lock-up clutch, the controller engaging the lock-up clutch if a transmission gear other than a predetermined one is selected for starting when the vehicle is stopped.

6. The power transmission arrangement of claim 5, wherein the controller starts engagement of the multi-plate clutch when an engine revolution speed is raised to a prescribed value upon accelerator pedal stamping from a vehicle stopped condition, and engages the lock-up clutch when a transmission gear position other than a predetermined one is selected for starting and the engine revolution speed is raised to the prescribed value.

* * * * *